(12) United States Patent
Yokomizo

(10) Patent No.: US 6,896,918 B2
(45) Date of Patent: *May 24, 2005

(54) MANNOSE-CONTAINING PALM KERNEL MEAL

(75) Inventor: Futoshi Yokomizo, Izumisano (JP)

(73) Assignee: Fuji Oil Co., LTD, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/677,622

(22) Filed: Oct. 2, 2003

(65) Prior Publication Data

US 2004/0151804 A1 Aug. 5, 2004

Related U.S. Application Data

(63) Continuation-in-part of application No. PCT/JP02/03094, filed on Mar. 28, 2002.

(30) Foreign Application Priority Data

Apr. 5, 2001 (JP) ........................................ 2001-106956

(51) Int. Cl.7 .............................. A23B 9/28; A23K 1/14
(52) U.S. Cl. ............................ 426/52; 426/53; 426/615
(58) Field of Search ............................. 426/52, 53, 617, 426/635, 629, 615

(56) References Cited

FOREIGN PATENT DOCUMENTS

| JP | 2000-270890 | * 10/2000 | ........... C12P/19/14 |
| WO | WO 95/17103 | 6/1995 | |
| WO | WO 02/052947 A1 | 7/2002 | |

OTHER PUBLICATIONS

Patent Abstracts of Japan, vol. 2002, No. 6, Jun. 4, 2002 & JP 2002 060343 A, Feb. 26, 2002, Abstract.

Patent Abstracts of Japan, vol. 2000, No. 25, Apr. 12, 2001 & JP 2001 231951 A, Aug. 28, 2001, Abstract.

* cited by examiner

*Primary Examiner*—Keith Hendricks
(74) *Attorney, Agent, or Firm*—Frommer Lawrence & Haug; Thomas J. Kowalski

(57) ABSTRACT

Mannose-containing palm kernel meal obtained by functioning a mannan degrading enzyme or an acidic catalyst to palm kernel meal. Mannose can be produced at a high yield by using palm kernel meal which is highly resourceful. An extraction process is not necessarily required in using free mannose effectively so that enzymically treated palm kernel meal containing the degradation product may be used untreated. It may be dried or extracted if necessary.

10 Claims, 1 Drawing Sheet

MANNOSE-CONTAINING PALM KERNEL MEAL

REFERENCE TO RELATED APPLICATIONS

This application is a continuation-in-part of International Application PCT/JP02/03094 filed on Mar. 28, 2002 and published as WO 02/081724 A1 on Oct. 17, 2002, which application claims priority from Japanese Application No. 2001-106956 filed Apr. 5, 2001.

Each of the foregoing applications, and each document cited or referenced in each of the foregoing applications, including during the prosecution of each of the foregoing applications and ("application cited documents"), and any manufacturer's instructions or catalogues for any products cited or mentioned in each of the foregoing applications and articles and in any of the application cited documents, are hereby incorporated herein by reference. Furthermore, all documents cited in this text, and all documents cited or referenced in documents cited in this text, and any manufacturer's instructions or catalogues for any products cited or mentioned in this text or in any document hereby incorporated into this text, are hereby incorporated herein by reference. Documents incorporated by reference into this text or any teachings therein may be used in the practice of this invention. Documents incorporated by reference into this text are not admitted to be prior art.

It is noted that in this disclosure and particularly in the claims, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

TECHNICAL FIELD

The present invention relates to mannose-containing palm kernel meal as a feedstuff additive, which is effective for preventing infection caused by bacteria, especially by Salmonella.

PRIOR ARTS

To date, a feedstuff supplemented with mannosides has been known to have the effect of excreting *Samonella* from animals fed with such feedstuff (Poultly Science 1989 68 1357). It is also known that mannan is richly contained in copra meal which is produced as being residue remaining after coconut oil is extracted. A method is proposed wherein mannose or mannose-polisaccharides is produced through the function of enzymes to materials containing galactomannans such as copra meal, and wherein it is extracted and is dried by spray-drying etc. (Japanese Laid-Open Patent Application No.1995-236429, Japanese Laid-Open Patent Application No.1996-173055).

Most of *Arecaceae* plants that are materials for copra meal, however, are growing wild and whose yields largely depend on weather conditions and on diligence of farmers harvesting the plants. The yields, naturally, may decrease and the price may increase from year to year according to these situations.

The copra yielded is dried either by smoking or under the sun. Smoke-drying sometimes causes insufficient sterilization, which may lead to the mycotoxin development. In addition, taste of livestock may considerably be deteriorated by the smell of smoke or the like.

As discussed above, to produce mannose with copra as a material leaves some anxiety behind in supplying. Under these circumstances, market has been waiting for a method to constantly supply mannose as a feed-additive at a lower price.

Mostly in Malaysia, palm has administratively been grown as a national strategy since the late 1940's. As a result of this, the estate for palm is as large as 2,000,000 hectares today. Fruit of the palm is used as a material for oil, which produces two kinds of oil, palm oil from the fruit part and palm kernel oil from the palm kernel. Palm kernel meal used in the present invention is produced as residue remaining after oil is extracted from palm kernel or as residue remaining after oil is further extracted with a solvent, whose production is about 1,700,000 tons per year (Oil World 1999). Most of the palm kernel meal is used as a feedstuff for livestock or as fuels.

However palm kernel meal is hardly made the most of, being discarded as industrial waste due to its low digestibility or low nutritiveness as a feedstuff and its poor combustibility as a fuel. Mannan is known to be richly contained in meals derived from *Arecaceae* plants such as copra meal or palm kernel meal etc. Palm kernel meal contains mannan at 25 to 32% and is thus expected to be used as a material for mannose or mannooligosaccharide, but studies for actually utilizing mannose-containing feedstuff with regard to the above have scarcely been conducted. Only those disclosed are such that palm kernel meal is enzymically degraded to generate oligosaccharide and thus obtained product is used for the purpose of improving the taste of feedstuff (PCT/GB94/02802), such that palm kernel meal-derived mannose is expected to have an effect to eliminate *Samonella* (British Poultry Science 1997 38 485–488), and the lile.

The present inventors have enzyme functioned to the palm kernel meal and found that unexpectedly large amount of mannose can be produced compared to the conventional methods using copra meal as a material. Here the invention has completed.

SUMMARY OF THE INVENTION

The present invention focuses on mannose-containing palm kernel meal obtained by functioning a mannan degrading enzyme or acidic catalyst to palm kernel meal, a feedstuff comprising said palm kernel meal and a method for producing these.

BEST MODE TO CARRY OUT THE INVENTION

Figure 1:
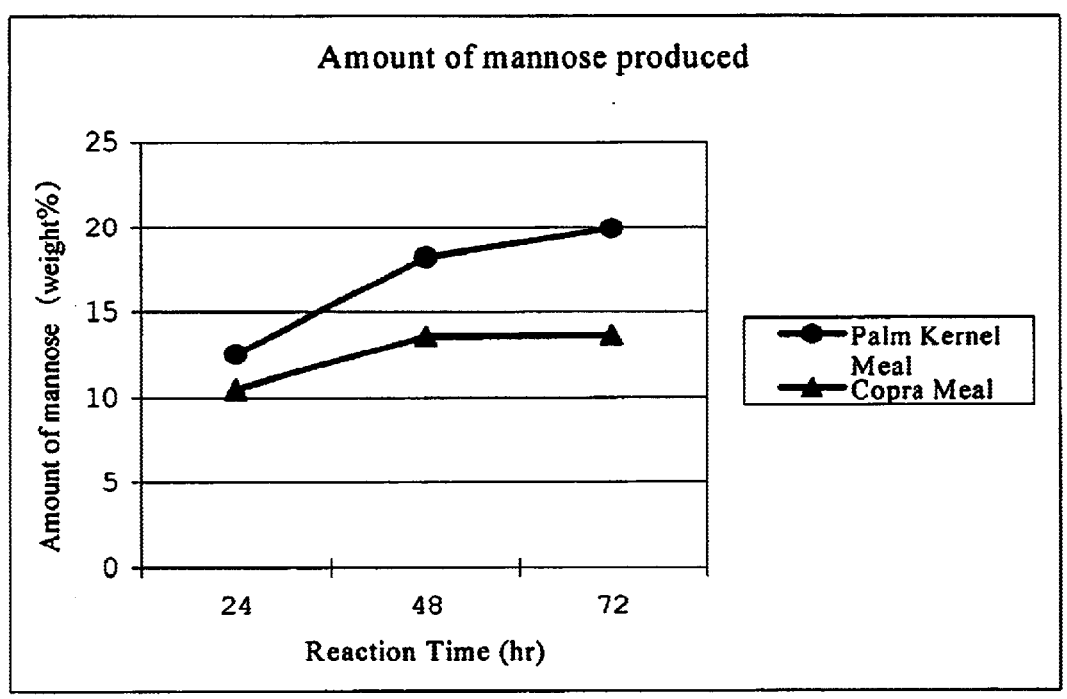
FIG. 1 is a graph showing the mannose amount produced by functioning a mannan degrading enzyme to palm kernel meal and to copra meal.

Palm kernel meal is residue remaining after the oil (palm kernel oil) is extracted from the albumen (palm kernel) of Elaeis gunineensis fruits planted mainly in Malaysia, Indonesia, and Nigeria, and is widely used as a material for a feedstuff with mixed components and the like. Palm kernel meal is classified, according to the methods of taking oil, into expelled residue (expelled palm kernel meal, oil content: 6–12%) and residue remaining after oil is further extracted using a solvent from such expelled residue (extracted palm kernel meal, oil content: 2% or under), both of which may be used in the present invention. Palm kernel meal contains about 29–38 weight % of mannan, and like copra meal, a great amount of mannose or its oligosaccharides can be produced through hydrolysis.

Any kind of mannnan degrading enzyme may be used as long as it degrades palm kernel mannan such as mannanase, mannosidase, hemicellulase, etc. While those that are Aspergillus niger-derived and commercially available (for instance Hemicellulase GM "AMANO"/Amano Pharmaceutical (trade name), Sumizyme ACH/Shin Nihon Chemical (trade name), Cellulosin GM5/Hankyu Bioindustry (trade name), Cellulase Y-NC/Yakult Pharmaceutical (trade name)) are preferably used. Other than these, those commercially available as xylanase or cellulase having said hydrolytic activity may be used.

A mannnan degrading enzyme is functioned to palm kernel meal in the enzymic solution where the enzyme is dissolved/dispersed in water. Here the preparation of water content of the reaction systems (palm kernel meal, mannnan degrading enzyme, and water) is important in order to cause the reaction effectively. Sufficient amount of water makes fiber in palm kernel meal well absorb water, so that the enzymic solution may easily become in contact with palm kernel meal. To make this occur, 50–1000 parts by weight of water to 100 parts by weight of palm kernel meal needs to be added. However, more water than needed will dilute enzyme concentration, which as a consequence not only lowers the reaction efficiency but increases cost for drying in the drying process where drying is taken place. Taken together, therefore, adequate amount of water added to 100 parts by weight of palm kernel meal is preferably 100–500 parts by weight, more preferably 150–250 parts by weight.

A mixture of palm kernel meal, a mannan degrading enzyme and water being prepared to be under said water condition is left at the optimal temperature for the enzymic activity where the reaction is caused, and the wet composition is obtained. Mannose or mannosides (mannobiose, mannotriose, mannooligosaccharides) are generated with the amounts depending on the reaction time in the wet composition. When the reaction is occurred for 24 to 72 hours, up to about 10–25 parts by weight of mannose are produced to 100 parts by weight of the material palm kernel meal, while it depends on the amount of enzyme used.

When using thus obtained mannose as a feedstuff additive for preventing *Samonella* infection, it can be supplied as a feedstuff without any particular extraction. Meanwhile, palm kernel meal after the reaction contains considerable amount of water and the development of mold and fungi is apprehended when distributed and used untreated. In which case, the palm kernel meal may be dried for the water content to be equal or less than 10% by methods such as fluidized-bed drying or the like. Further, when highly purified mannose is required as materials for fine chemicals, it may be extracted and purified with an adequate catalyst such as water etc.

The present invention will be explained in detail with references to the examples of the invention, but the invention will not be limited to the examples described below.

EXAMPLE 1

1/60 g (about 167 units) of Mannanase (Cellulosin GM5/Hankyu Bioindustry (trade name)) was dissolved in 20 g of water and mixed with 10 g of expelled palm kernel meal (oil content 6.5%, water content 5.1%). The mixture was then transferred into a sealed container and kept at 60° C. to make the reaction occur. Palm kernel meal is replaced with copra meal and reaction was made to occur just as the same for comparison. After the reaction, the amount of mannose produced was determined as follows. About 0.5 g of the reactant was exactly measured and it was added water to 100 ml of constant volume. The mixture was filtered to separate the solution phase and was, for instance, deprotenized when necessary, followed by determination with anion exchange chromatography (equipment: DX 500, column used; Carbo Pac PA1, detector: Pulsed Amperometoric Detector/all of these are Dionex products). The results obtained are shown in Table 1 and FIG. 1. Amount of mannose produced is increased by 20–50% compared to the conventional case using copra meal as a substrate.

TABLE 1

Relationship between amount of mannose produced and the reaction time

| Reaction time | Amount of mannose produced (weight % vs each meal) | |
| --- | --- | --- |
| | Palm kernel meal | Copra meal |
| 24 | 12.52 (%) | 10.49 (%) |
| 48 | 18.24 | 13.59 |
| 72 | 19.93 | 13.68 |

Table 2 shows the composition rate of monosaccharides produced in the meals that are enzymically treated for 72 hours. Palm kernel meal has higher rate of mannose than the degradation product of copra meal. This means that in case mannose is isolated and purified from the enzymically treated product by chromatocolumn method or the like, a burden to the column is expected to be lighter, which is more preferable.

TABLE 2

Monosaccharides of composition (%) produced in the product enzymically treated for 72 hours

| | Arabinose | Galactose | Glucose | Xylose | Mannose | fructose |
| --- | --- | --- | --- | --- | --- | --- |
| Palm kernel meal | 2.05 | 2.08 | 6.76 | 0 | 84.59 | 4.52 |
| Copra meal. | 0.42 | 0.40 | 13.15 | 0.15 | 65.66 | 20.23 |

What is claimed is:

1. Mannose-containing palm kernel meal obtained by treating a mannan degradation enzyme or an acidic catalyst to palm kernel meal.

2. A method for producing mannose-containing palm kernel meal wherein palm kernel meal is treated with a mannan degrading enzyme.

3. Mannose-containing palm kernel meal according to claim 1, which is dried.

4. Feedstuff containing mannose-containing palm kernel meal according to claim 1.

5. A composition according to claim 1, wherein the mannan degrading enzyme is derived from Aspergillus fungus.

6. Mannose-containing enzymically treated palm kernel meal, wherein at least a part of mannan contained in the palm kernel meal is degraded.

7. The mannose-containing enzymically treated palm kernel meal according to claim 6, containing mannose at 1–30 weight %.

8. A feedstuff comprising the mannose-containing palm kernel meal produced by the method of claim 2.

9. A feedstuff comprising the mannose-containing palm kernel meal according to claim 3.

10. The method for producing mannose-containing palm kernel meal according to claim 2, wherein 100–500 parts by weight of a mannan degrading enzymic solution is reacted with 100 parts by weight of palm kernel meal.

* * * * *